(12) United States Patent
Meier et al.

(10) Patent No.: US 8,162,218 B2
(45) Date of Patent: Apr. 24, 2012

(54) USING A 2D IMAGER FOR RASTERING SCANNING

(75) Inventors: Timothy P. Meier, Camillus, NY (US); Matthew W. Pankow, Camillus, NY (US)

(73) Assignee: Hand Held Products, Inc., Skaneateles Falls, NY (US)

( * ) Notice: Subject to any disclaimer, the term of this patent is extended or adjusted under 35 U.S.C. 154(b) by 1254 days.

(21) Appl. No.: 11/901,377

(22) Filed: Sep. 17, 2007

(65) Prior Publication Data

US 2009/0072034 A1 Mar. 19, 2009

(51) Int. Cl.
*G06K 7/10* (2006.01)
(52) U.S. Cl. ...................................................... 235/454
(58) Field of Classification Search .................. 235/451, 235/454, 462.01, 462.07, 462.09, 472.01–472.03
See application file for complete search history.

(56) References Cited

U.S. PATENT DOCUMENTS

| | | | | |
|---|---|---|---|---|
| 5,360,968 | A * | 11/1994 | Scott | 235/454 |
| 6,814,290 | B2 * | 11/2004 | Longacre | 235/462.1 |
| 7,568,628 | B2 * | 8/2009 | Wang et al. | 235/462.45 |
| 2004/0118928 | A1 * | 6/2004 | Patel et al. | 235/472.01 |
| 2004/0195332 | A1 * | 10/2004 | Barber et al. | 235/462.11 |

* cited by examiner

*Primary Examiner* — Seung Lee
(74) *Attorney, Agent, or Firm* — Richard A. Romanchik, Esq.; Hiscock & Barclay, LLP

(57) ABSTRACT

A method of operating an optical reader having a 2D image sensor array having an array of rows and columns of pixels comprising the steps of: (a) configuring the image sensor array to output a select set of pixels; (b) capturing an image; (c) outputting the pixel data from the select set of pixels to memory; (d) processing the pixel data for information bearing indicia (IBI); (e) reconfiguring the image sensor array to output a different set of pixels; (f) repeating steps (b) through (e).

19 Claims, 10 Drawing Sheets

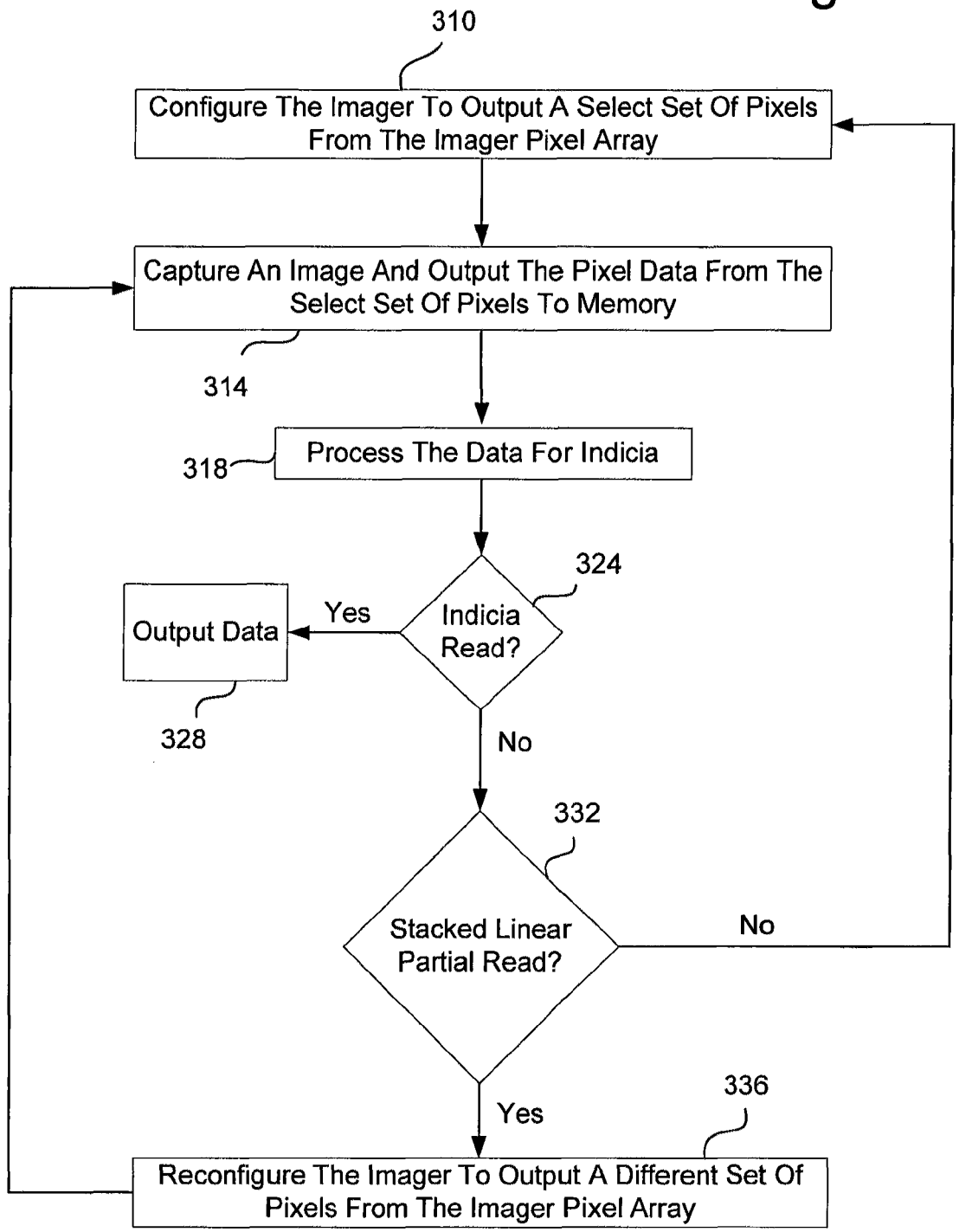

USING A 2D IMAGER FOR RASTERING SCANNING

FIELD OF THE INVENTION

The present invention relates to optical reading devices, and more particularly to an optical reading device having a two dimensional imager.

BACKGROUND

Indicia reading devices (also referred to as scanners, image reader, readers, etc.) typically read data represented by printed indicia, (also referred to as symbols, symbology, bar codes, etc.) For instance one type of a symbol is an array of rectangular bars and spaces that are arranged in a specific way to represent elements of data in machine readable form. Indicia reading devices typically transmit light onto a symbol and receive light scattered and/or reflected back from a bar code symbol or indicia. The received light is interpreted by a processor which performs signal and/or image processing to extract the data represented by the symbol. Optical indicia reading devices typically utilize visible light. Laser indicia reading devices typically utilize transmitted laser light.

One-dimensional (1D) optical bar code readers are characterized by reading data that is encoded along a single axis, in the widths of bars and spaces, so that such symbols may be read from a single scan along that axis, provided that the symbol is sampled with a sufficiently high resolution along that axis.

In order to allow the encoding of larger amounts of data in a single bar code symbol, a number of 1D stacked bar code symbologies have been developed which partition encoded data into multiple rows, each including a respective 1D bar code pattern, some or all of which must be scanned and decoded, then linked together to form a complete message. Scanning still requires relatively higher resolution in one dimension only, but multiple linear scans at different locations on a second dimension are needed to read the whole symbol.

A class of bar code symbologies known as two dimensional (2D) matrix symbologies have been developed which require image based reading and offer greater data densities and capacities than 1D symbologies. 2D matrix codes encode data as dark or light data elements within a regular polygonal matrix, accompanied by graphical finder, orientation and reference structures.

Often times an optical reader may be portable and wireless in nature thereby providing added flexibility. In these circumstances, such readers form part of a wireless network in which data collected within the terminals is communicated to a host computer situated on a hardwired backbone via a wireless link. For example, the readers may include a radio or optical transceiver for communicating with a remote computer.

Some data collection devices, such as hand-held image readers, are capable of capturing images as well as reading barcodes. The reading and decoding of a barcode represents an operation distinct from that involved in capturing an image. The reading and decoding of a bar code involves the imaging and then decoding of a one or two dimensional graphic symbol into the alphanumeric, full ASCII or other data sequence encoded by the symbol. The capturing of an image involves storing an electronic visual copy/representation of the image.

Efforts regarding such systems have led to continuing developments to improve their versatility, practicality and efficiency.

BRIEF DESCRIPTION OF THE DRAWINGS

FIG. 7 is a flow chart of an exemplary method of operating an image reader.

DETAILED DESCRIPTION

The invention features a system and method for automatically discriminating between different types of data with an image reader. A human operator may aim a hand-held image reader at a target containing a form, information bearing indicia (IBI) or dataform, text, or other element and actuate a trigger on an image reader. An IBI or dataform may be an originally machine generated symbology that is also machine readable, such as a 1-D barcode, a 2-D barcode, a 1-D stacked barcode, a logo, glyphs, color-codes, and the like.

When using an embodiment of an image reader, a human operator may intuitively point the reader directly at the data to be collected, regardless of its type, and actuate a trigger.

Figure 1:
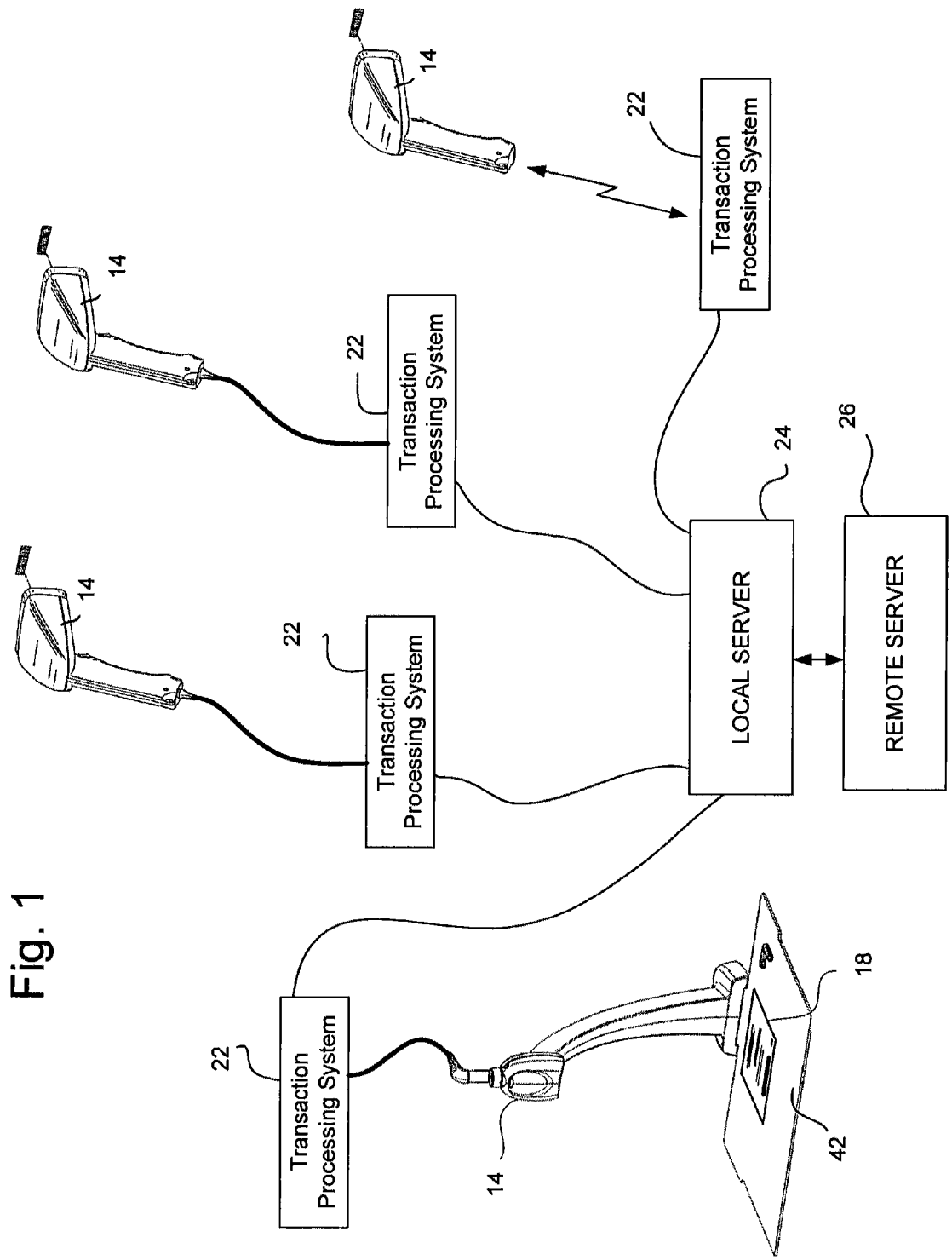
FIG. 1 is a block diagram of an exemplary image reader system.

FIG. 1 illustrates a scanning system configuration in accordance with the present invention, wherein a plurality of image readers 14 are being operated or utilized in a facility, such as a retail store. An exemplary image reader has an image sensor which digitizes a representative image seen in an imaging field of view. The image readers may be in communication (wired or wireless) to a local transaction processing system 22, such as a cash register, customer station or employee station. The transaction processing systems 22 may be in communication (wired or wireless) with a local server 24.

Figure 2:
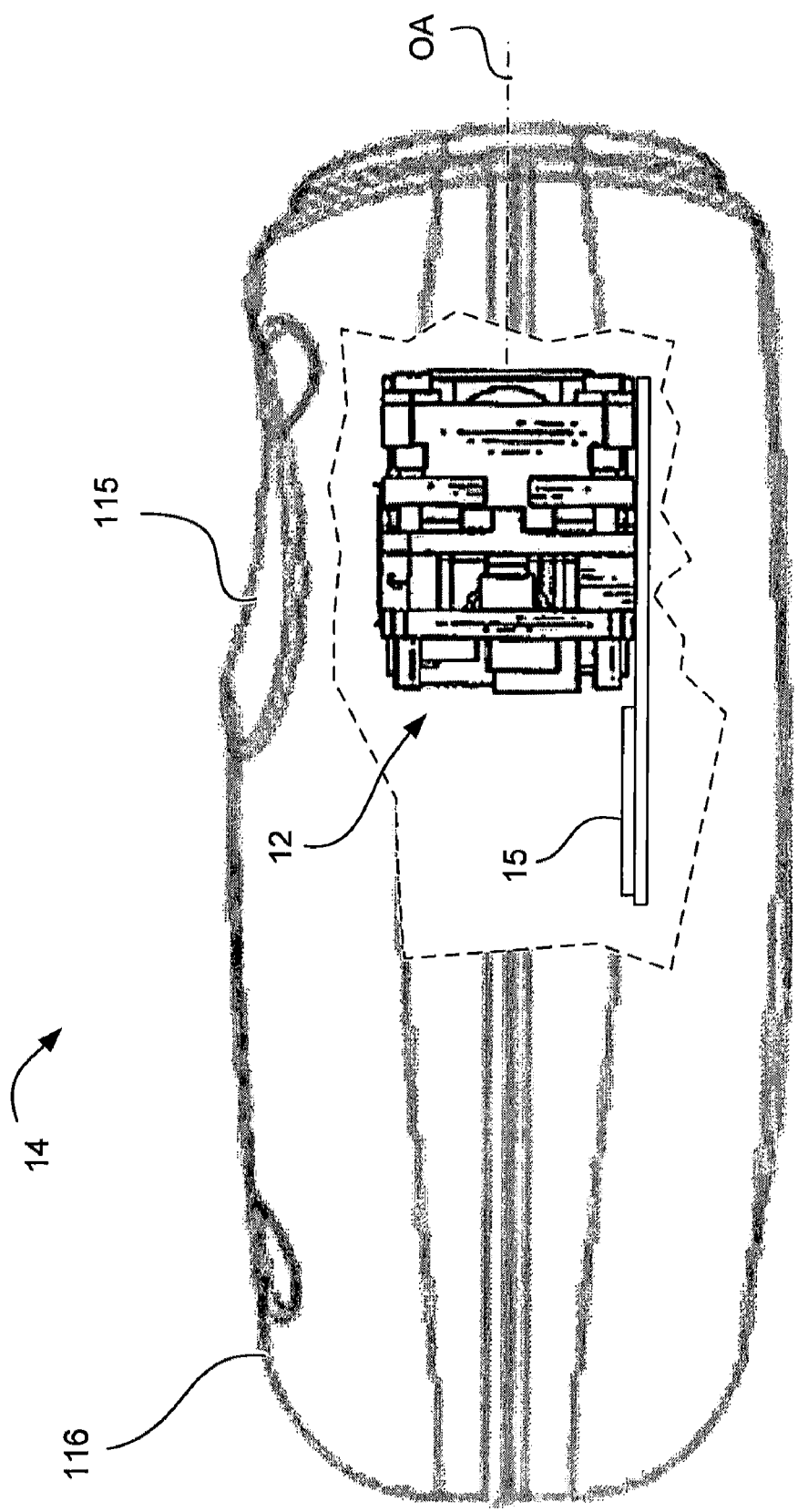
FIG. 2 is a fragmentary partially cutaway side view of an exemplary image reader.
Figure 3:
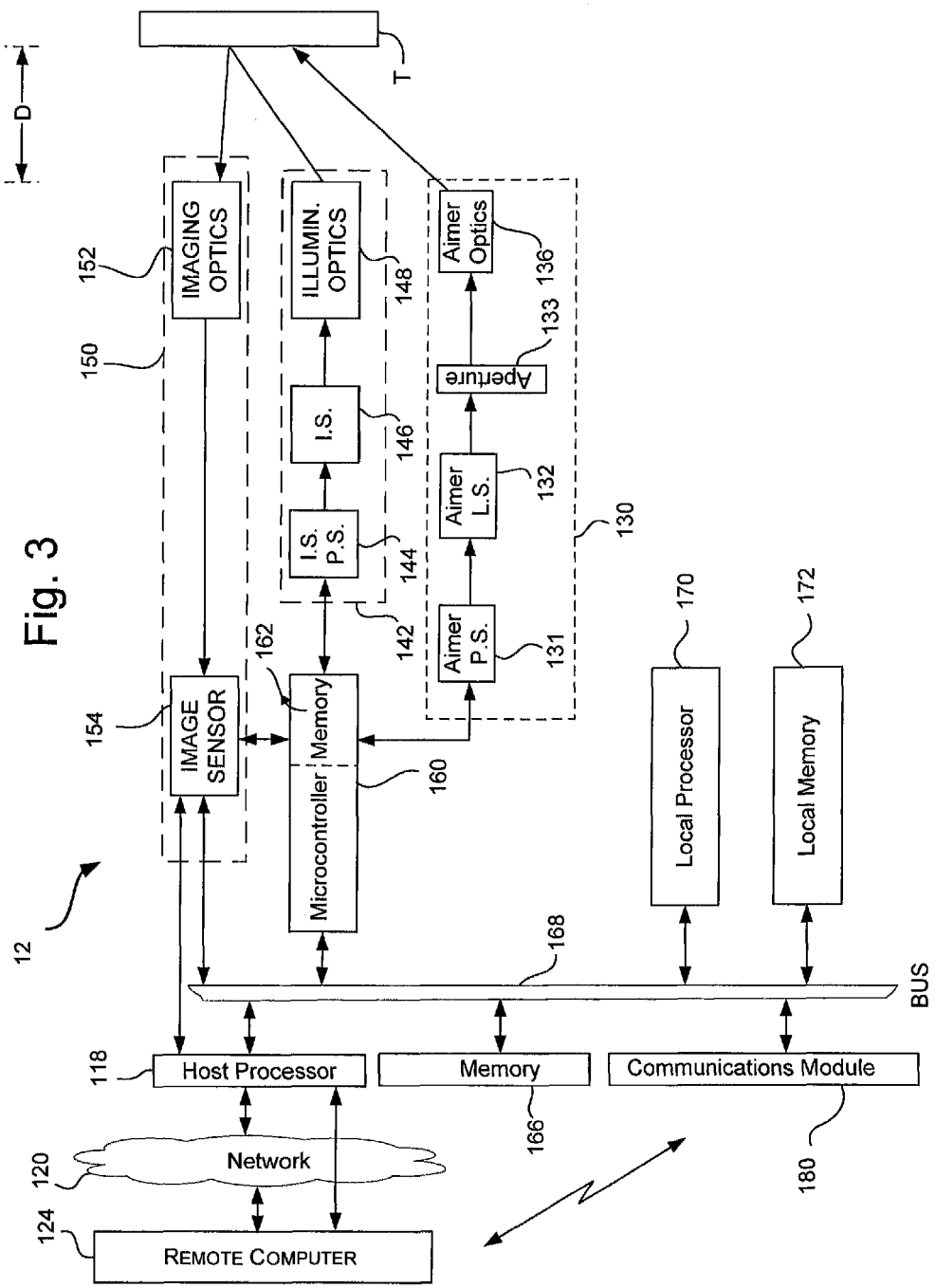
FIG. 3 is a block schematic diagram of an exemplary imaging module.

Referring to FIGS. 2 and 3, an optical indicia reader 14 may have a number of subsystems for capturing and reading images, some of which may have symbol indicia provided therein. Reader 14 may have an imaging reader assembly 12 provided within a head portion or housing 116 which may be configured to be hand held by an operator. A trigger 115 may be used to control operation of the reader 14. Image reader assembly 12 has imaging receive optics 152 having an optical axis (OA) for receiving light reflected from a target T and directing or projecting the reflected light from the target T to an image sensor 154. The optical axis is a line of symmetry through the imaging optics.

The receive optics 152 has a focal point wherein parallel rays of light coming from infinity converge at the focal point. If the focal point is coincident with the image sensor, the target (at infinity) is "in focus". A target T is said to be in focus if light from target points are converged about as well as desirable at the image sensor. Conversely, it is out of focus if light is not well converged. "Focusing" is the procedure of adjusting the distance between the receive optics and the image sensor to cause the target T to be approximately in focus.

The target may be any object or substrate and may bear a 1D or 2D bar code symbol or text or other machine readable indicia. A trigger 115 may be used for controlling full or partial operation of the reader 14.

Image sensor 154 may be a two-dimensional array of pixels adapted to operate in a global shutter or full frame operating mode which is a color or monochrome 2D CCD, CMOS, NMOS, PMOS, CID, CMD, etc. solid state image sensor. This sensor contains an array of light sensitive photodiodes (or pixels) that convert incident light energy into electric charge. Solid state image sensors allow regions of a full frame of image data to be addressed. An exemplary CMOS sensor is model number MT9V022 from Micron Technology Inc. or model number VC5602V036 36CLCC from STMicroelectronics.

Further description of image sensor operation is provided in commonly owned U.S. patent application Ser. No. 11/077, 995 entitled "BAR CODE READING DEVICE WITH GLOBAL ELECTRONIC SHUTTER CONTROL" filed on Mar. 11, 2005, which is hereby incorporated herein by reference in it's entirety.

In a full frame (or global) shutter operating mode, the entire imager is reset before integration to remove any residual signal in the photodiodes. The photodiodes (pixels) then accumulate charge for some period of time (exposure period), with the light collection starting and ending at about the same time for all pixels. At the end of the integration period (time during which light is collected), all charges are simultaneously transferred to light shielded areas of the sensor. The light shield prevents further accumulation of charge during the readout process. The signals are then shifted out of the light shielded areas of the sensor and read out.

Features and advantages associated with incorporating a color image sensor in an imaging device, and other control features which may be incorporated in a control circuit are discussed in greater detail in U.S. Pat. No. 6,832,725 entitled "An Optical Reader Having a Color Imager" incorporated herein by reference. It is to be noted that the image sensor 154 may read images with illumination from a source other than illumination source 146, such as by illumination from a source located remote from the reader.

The output of the image sensor may be processed utilizing one or more functions or algorithms to condition the signal appropriately for use in further processing downstream, including being digitized to provide a digitized image of target T. Digitizing or digitization may be representing an object, an image, or a signal (usually an analog signal) by a discrete set of its points or samples. The result is called "digital representation" or, more specifically, a "digital image", for the object, and "digital form", for the signal. Digitization may be performed by reading an analog signal A, and, at regular time intervals (sampling frequency), representing the value of A at that point by an integer. Each such reading is called a sample.

A microcontroller 160 may perform a number of processing functions and be located on board with other components, such as the image sensor. The particulars of the functionality of microcontroller 160 may be determined by or based upon certain configuration settings or data which may be stored in remote or local memory 162, 166, 172. One such function may be controlling the amount of illumination provided by illumination source 146 by controlling the output power provided by illumination source power supply 144. Microcontroller 160 may also control other functions and devices.

An exemplary microcontroller 160 is a CY8C24223A made by Cypress Semiconductor Corporation, which is a mixed-signal array with on-chip controller devices designed to replace multiple traditional MCU-based system components with one single-chip programmable device. It may include configurable blocks of analog and digital logic, as well as programmable interconnects.

Microcontroller 160 may include a predetermined amount of memory 162 for storing firmware and data. The firmware may be a software program or set of instructions embedded in or programmed on the microcontroller which provides the necessary instructions for how the microcontroller operates and communicates with other hardware. The firmware may be stored in the flash memory (ROM) of the microcontroller as a binary image file and may be erased and rewritten. The firmware may be considered "semi-permanent" since it remains the same unless it is updated. This firmware update or load may be handled by a device driver.

The components in reader 14 may be connected by one or more bus 168, data lines or other signal or data communication form. Exemplary forms may be an Inter-IC bus such as a two wire interface (TWI), dedicated data bud, RS232 interface, USB, etc.

A TWI bus is a control bus that provides a communications link between integrated circuits in a system. This bus may connect to a host computer in relatively close proximity, on or off the same printed circuit board as used by the imaging device. TWI is a two-wire serial bus with a software-defined protocol and may be used to link such diverse components as the image sensor 154, temperature sensors, voltage level translators, EEPROMs, general-purpose I/O, A/D and D/A converters, CODECs, and microprocessors/microcontrollers.

A host processor 118 or a local processor 170 may be utilized to perform a number of functional operation, which may involve the performance of a number of related steps, the particulars of which may be determined by or based upon certain configuration settings stored in memory 166 which may be any one of a number of memory types such as RAM, ROM, EEPROM, etc. In addition some memory functions may be stored in memory 162 provided as part of the microcontroller 160. An exemplary processor may be a ST Microelectronics product number ST™32F103 or MagnaChip Semiconductor product number MC521EA.

An exemplary function of a processor 118, 170 may be to decode machine readable symbology provided within the target or captured image. One dimensional symbologies may include very large to ultra-small, Code 128, Interleaved 2 of 5, Codabar, Code 93, Code 11, Code 39, UPC, EAN, MSI, or other 1D symbologies. Stacked 1D symbologies may include PDF, Code 16K, Code 49, or other stacked 1D symbologies. 2D symbologies may include Aztec, Datamatrix, Maxicode, QR-code, or other 2D symbologies. UPC/EAN bar codes are standardly used to mark retail products throughout North America, Europe and several other countries throughout the worlds. Decoding is a term used to describe the interpretation of a machine readable code contained in an image projected on the image sensor 154. The code has data or information encoded therein. Information respecting various reference decode algorithm is available from various published standards, such as by the International Standards Organization ("ISO").

An exemplary function of host processor 118, 170 may be to manipulate images, such as cropping or rotation such as described herein.

Imaging reader assembly 12 may also have an aiming generator light source 132, aiming aperture 133, aiming optics 136, an illumination source(s) 146 and illumination optics 148.

Illumination and aiming light sources with different colors may be employed. For example, in one such embodiment the image reader may include white and red LEDs, red and green LEDs, white, red, and green LEDs, or some other combination chosen in response to, for example, the color of the symbols most commonly imaged by the image reader. Different colored LEDs may be each alternatively pulsed at a level in accordance with an overall power budget.

Aiming pattern generator 130 may include a power supply 131, light source 132, aperture 133 and optics 136 to create an aiming light pattern projected on or near the target which spans a portion of the receive optical system 150 operational field of view with the intent of assisting the operator to properly aim the scanner at the bar code pattern that is to be read. A number of representative generated aiming patterns are possible and not limited to any particular pattern or type of pattern, such as any combination of rectilinear, linear, circular, elliptical, etc. figures, whether continuous or discontinuous, i.e., defined by sets of discrete dots, dashes and the like.

Generally, the aiming light source may comprise any light source which is sufficiently small or concise and bright to provide a desired illumination pattern at the target. For example, light source 132 for aiming generator 130 may comprise one or more LEDs, such as part number NSPG300A made by Nichia Corporation.

The light beam from the LEDs 132 may be directed towards an aperture 133 located in close proximity to the LEDs. An image of this back illuminated aperture 133 may then be projected out towards the target location with a lens 136. Lens 136 may be a spherically symmetric lens, an aspheric lens, a cylindrical lens or an anamorphic lens with two different radii of curvature on their orthogonal lens axis. Alternately, the aimer pattern generator may be a laser pattern generator.

The light sources 132 may also be comprised of one or more laser diodes such as those available from Rohm. In this case a laser collimation lens (not shown in these drawings) will focus the laser light to a spot generally forward of the scanning hear and approximately at the plane of the target T. This beam may then be imaged through a diffractive interference pattern generating element, such as a holographic element fabricated with the desired pattern in mind. Examples of these types of elements are known, commercially available items and may be purchased, for example, from Digital Optics Corp. of Charlotte, N.C. among others. Elements of some of these types and methods for making them are also described in U.S. Pat. No. 4,895,790 (Swanson); U.S. Pat. No. 5,170,269 (Lin et al) and U.S. Pat. No. 5,202,775 (Feldman et al), which are hereby incorporated herein by reference.

Image reader may include an illumination assembly 142 for illuminating target area T. Illumination assembly 142 may also include one or more power supplies 144, illumination sources 146 and illumination optics 148.

A communications module 180 provides a communication link from imaging reader 14 to other imaging readers or to other systems such as a server/remote processor 124.

The processor, memory and associated circuitry which performs or controls the exemplary image manipulations (e.g. image cropping function) described hereinbefore may be provided in the image reader assembly 12 or on associated circuit boards 15 which are located within the housing 116 of the image reader 14.

Figure 4:
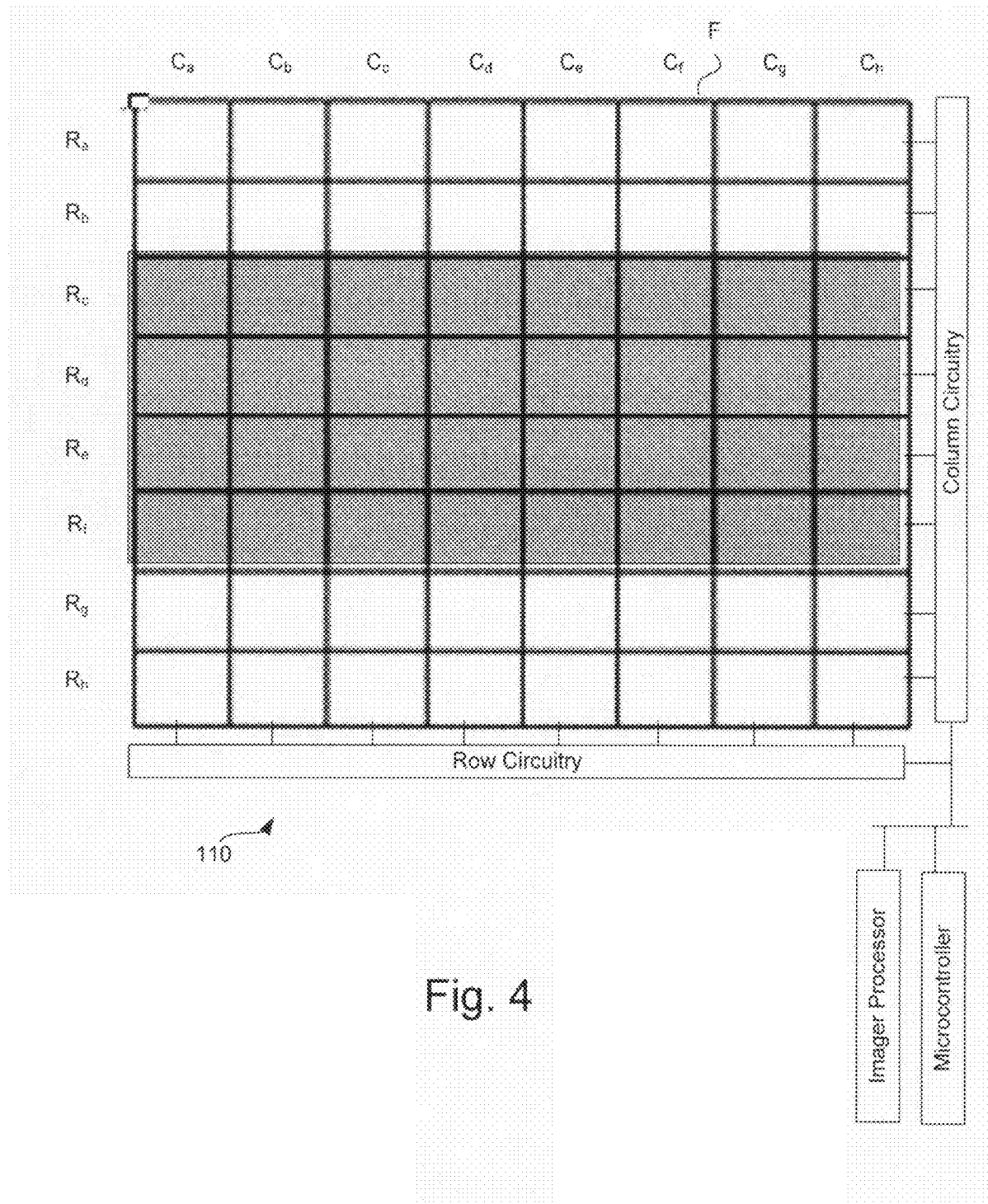
FIG. 4 is a block schematic diagram of an exemplary image sensor.

An exemplary image reader 14 is described with reference to FIG. 4, wherein a two-dimensional array of pixels is incorporated onto CMOS image sensor array adapted to operate in a limited or restricted global shutter operating mode, wherein a substantial number but less than all of the pixels of the image sensor are exposed and the charge of the exposed pixel data is read out. Row circuitry and the column circuitry may enable one or more various processing and operational tasks such as addressing pixels, decoding signals, amplification of signals, analog-to-digital signal conversion, applying timing, read-out and reset signals and the like.

In an exemplary embodiment, the collected charge of only a predetermined number of pixel rows (i.e. rows $R_c$-$R_f$) may be read out to the integrated microcontroller memory 162 or other memory, such as memory located or integrated with the image sensor. Since only a relatively small number of rows of data are read out, the amount of necessary memory and therefore the footprint necessary to house the image reader assembly remains low. In this embodiment the system may only be capable of reading out a predetermined number of rows of data at a time. In an exemplary embodiment the first read out of predetermined rows are within the center of the imager array.

As an example, an image sensor may have a full pixel dimension of 864×640, but the microcontroller memory may be only large enough to hold 20 rows of pixel data. The image sensor may be configured to only capture predetermined rows such as the middle 20 rows of the image (for example rows 310-329 in the array). If while decoding the output data from those rows a 2-D symbol such as a PDF symbol is detected, the image sensor may be reconfigured to capture rows different predetermined rows such as rows 290-309 for the next frame, and then rows 330-349 for the next, and then rows 270-289 for the following, and rows 350-369 for the next, etc. The imager may continue to move up and down in the array capturing different sets of rows from frame to frame which permits gathering all of the data of the target and decode it. Detection of capture of the top and or bottom of a symbol in the image space itself may eliminate the need to capture rows which are higher or lower in the frame.

In the example of PDF or other stacked symbologies, there might not be enough data in only a handful of rows to decode the symbol. If such symbologies are detected, the image sensor may be reconfigured from frame to frame to capture different rows of pixels. In a group of successive frames, capture of a wider area of a PDF or stacked code from top to bottom and be able to decode it without having to physically swipe the imager by moving the imaging reader 14 so that the imager may collect the data in the code.

In an exemplary embodiment, the image sensor itself dictates which pixel rows get "exposed" and which don't in any operating mode including a windowed down mode. The image sensor may drain the pixel charge at the beginning of the exposure time, and then offload/store the charge at the end of the exposure time to preserve its value.

The time during which a target is illuminated is referred to as the illumination period. The time during which the aimer LEDs are on is referred to as the aiming period. The time during which the pixels are collectively activated to photo-convert incident light into charge defines the exposure period for the sensor array. The exposure period for each row may be controlled by a timing signal referred to as a row exposure timing signal. At the end of the exposure period, collected charge is read out.

The timing of the exposure period and the illumination period may be under the control of the control module or imager processor, which causes at least a portion of the exposure period to occur during the illumination period. The imager processor also organizes and processes the reading out of data from the sensor array in a rolling shutter mode capable of sequentially exposing and reading out the particular rows of pixels of the image sensor array. The time during which the pixels are collectively activated to photo-convert incident light into charge defines the exposure period for the sensor array. At the end of the exposure period the collected charge of selected or predefined pixel rows is transferred to a storage area until the data is read out. The imager processor controls the process to collect the pixel matrix information. A beginning of frame signal indicates the beginning of data collection for the frame F (pixel matrix). Among other things, the imager processor uses this signal to know when the image capture begins and ends with the frame or image being stored in system memory. The row exposure timing signal is a train of pulses used to time the collection of data for selected rows, for example predefined rows $R_c$-$R_f$ (or data block) in the frame.

An exemplary embodiment is to control the on/off sequence of the illumination of the aiming pattern so that the aiming pattern is turned off during predetermined times of image collection, such as when data is being collected from the pixel matrix in areas where the aiming pattern is being projected or superimposed onto the target. It may be desirable to produce a digital image of the target without the aiming pattern superimposed on the image. A technique which may be utilized to accomplish this objective is to use row read-out pulses to calculate when data is being collected in the pixel matrix rows that include the superimposed aiming pattern. For example as shown in FIG. 4, the aiming pattern might be imposed in frame F in the fourth and fifth rows Rd and Re. Data from the matrix is collected iteratively from each consecutive row during each consecutive row readout pulse. The aiming pattern might thus be turned off at an appropriate row coinciding with a first appropriate row readout pulse count, and then turning on the aiming pattern at a second appropriate row coinciding with a second respective row readout pulse count. So for the example in FIG. 4, it can be seen that the aiming pattern AP may be turned off and on at specific rows. Since the position of the aiming pattern within the frame is known, the appropriate row exposure pulse counts are known and may be stored in the imager processor memory 152 to be utilized for such aiming pattern on-off control. The frame illustrated in FIG. 4 is for example only. Typically, an image capture frame would consist of more pixel rows and columns than that shown.

Alternatively, the aimer may be left on for a predetermined amount of time after a predetermined row exposure pulse.

The aimer may also be controlled utilizing any of a number of sync signals or pulses provided by the image sensor for providing information with regard to when pixel data is available for read out. For instance, in addition to the exposure sync signal, the vertical sync signal (Vsync) the horizontal sync signal (Hsync), the pixel clock signal (Pixel clock), etc.

The image reader may be capable of operating in either the rolling shutter mode or a global electronic shutter mode. In the global electronic shutter operational mode, the image reader collects a full frame of image data wherein all image reader pixels are exposed nearly simultaneously and the data is stored and subsequently processed to, for example, decode a barcode contained in the image data.

Figure 5:
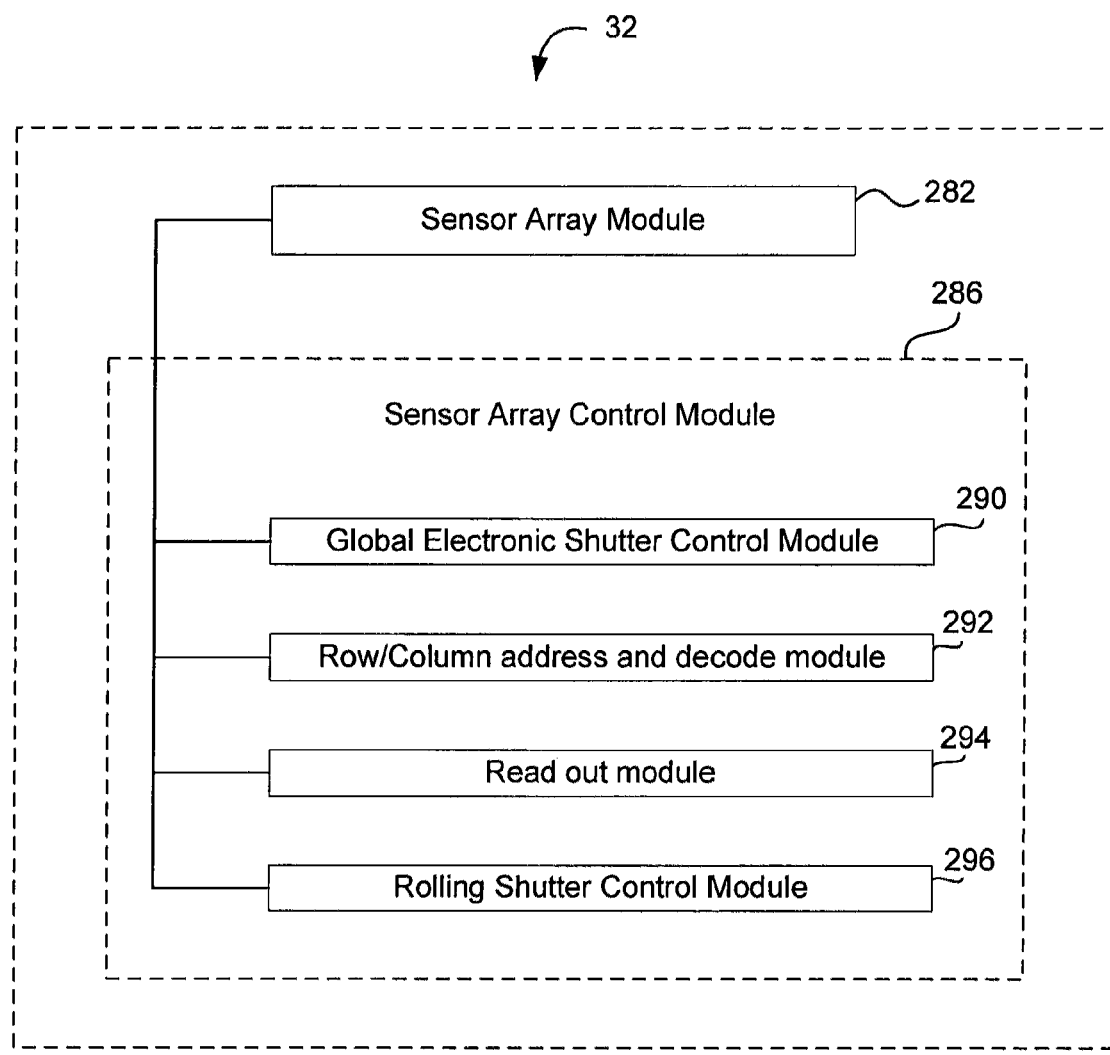
FIG. 5 is a block diagram of an exemplary image sensor.

Referring to FIG. 5, the image sensor 32 may be comprised of a sensor array module 282 and a sensor array control module 286. The sensor array control module includes a global electronic shutter control module 290, a row and column address and decode module 292, and a readout module 294, each of which is in electrical communication with one or more of the other modules in the image sensor 32. In one embodiment, the sensor array module 282 includes an integrated circuit with a two-dimensional CMOS based image sensor array. In various embodiments, associated circuitry such as analog-to-digital converters and the like can be discrete from the image sensor array or integrated on the same chip as the image sensor array. In an alternative embodiment, the sensor array module 282 can include a CCD sensor array capable of simultaneous exposure and storage of a full frame of image data. The global electronic shutter control module 290 is capable of globally and simultaneously exposing substantially all of the pixels in the image sensor array. In one embodiment, the global electronic shutter control module 290 includes a timing module. The row and column address and decode module 292 is used to select particular pixels for various operations such as collection activation, electronic shutter data storage and data read out. The readout module 294 organizes and processes the reading out of data from the sensor array. In some embodiments, the sensor array control module 286 further includes a rolling shutter control module 296 that is capable of sequentially exposing and reading-out the lines of pixels in the image sensor array.

Referring to FIGS. 6*a*-6*g* the invention is an optical reader equipped with a 2D image sensor that is configured to operate in a partial frame capture mode. In a partial frame clock out mode, a control circuit of an optical reader clocks out (or "reads") electrical signals corresponding to less than all of the 2D image sensor's pixels, and captures image data corresponding to the pixel locations into memory.

Partial frames of image data which may be clocked out and captured by an optical reader control circuit during a partial frame capture mode are illustrated in FIGS. 6*a*-6*g* in which valid zones 12 represent frame image data corresponding to image sensor pixel positions that are clocked out and invalid zones 14 represent potential image data positions corresponding to pixel positions that are not clocked out.

Border 10 defines the full field of view of an optical reader in the case the reader is operated in a full frame captured mode while symbols 16-1, 16-2, 16-3, 16-4, 16-5, 16-6 and 16-7 are symbols entirely within the full field of view of an optical reader defined by border 10 but are only partially within certain valid zones shown. Valid zones 12-1, 12-3, 12-7, 12-8, 12-9, 12-10, and 12-13 are valid zones of image data that partially contain representations of a decodable symbol while valid zones 12-11 and 12-12 are valid zones of image data captured during a partial frame capture mode which contain representations of an entire decodable symbol.

In the examples illustrated with reference to FIGS. 6*a*-6*d* an optical reader operating in a partial frame clock out mode clocks out electrical signals corresponding to linear patterns of pixels. It is useful to cause a reader to clock out electrical signals corresponding to linear patterns as shown in FIGS. 6*a*-6*d* when a reader will be used to decode mainly 1D linear bar code symbols.

In the examples illustrated with reference to FIGS. 6*e*-6*g* an optical reader operating in a partial frame clock out mode clocks out electrical signals corresponding to non-linear groupings of pixels. It is useful to cause a reader to clock out electrical signals corresponding to pixel groupings as shown in FIGS. 6*e*-6*g* when a reader may be used to decode symbols which are expected to be within a certain position in an image sensor's field of view.

The partial frame clock out mode may be implemented utilizing an image sensor which can be commanded to clock out partial frames of image data or which is configured with pixels that can be individually addressed. Using CMOS fabrication techniques, image sensors ate may be made so that electrical signals corresponding to certain pixels of a sensor can be selectively clocked out without clocking out electrical signals corresponding to remaining pixels of the sensor. CMOS image sensors are available from such manufacturers as Symagery, Pixel Cam, OmniVision, Sharp, National Semiconductor, Toshiba, Hewlett-Packard and Mitsubishi.

Referring again to exemplary aspects, a control circuit (in the example of FIG. 6a) executes a partial frame capture mode in order to clock out and capture pixel data illustrated by valid zone 12-1. Reading the pixel values of valid zone 12-1 is effective to decode 1D symbol 16-1 in the reader's full field of view. Given that clocking out and capturing image data of valid zone 12-1 consumes less time and less memory than clocking out and capturing a full frame of image data, it is seen that execution of a partial frame capture mode decreases the decode time of the reader.

Figure 6A:
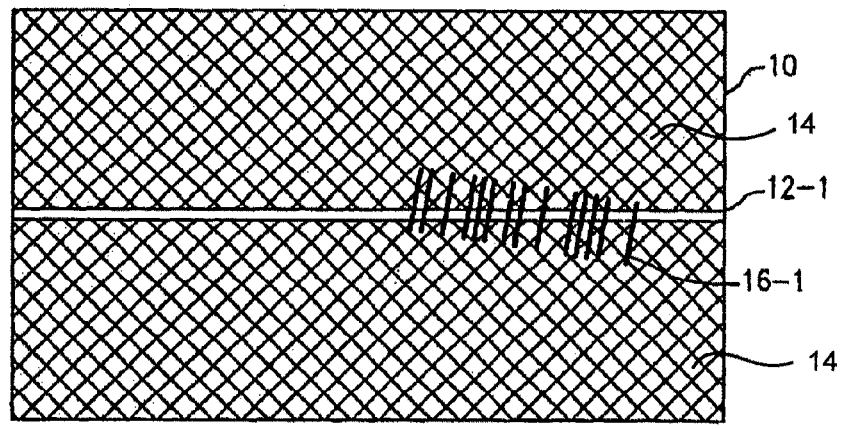
FIGS. 6*a-g* illustrate various exemplary image data patterns that may be captured by an optical reader.
Figure 6B:
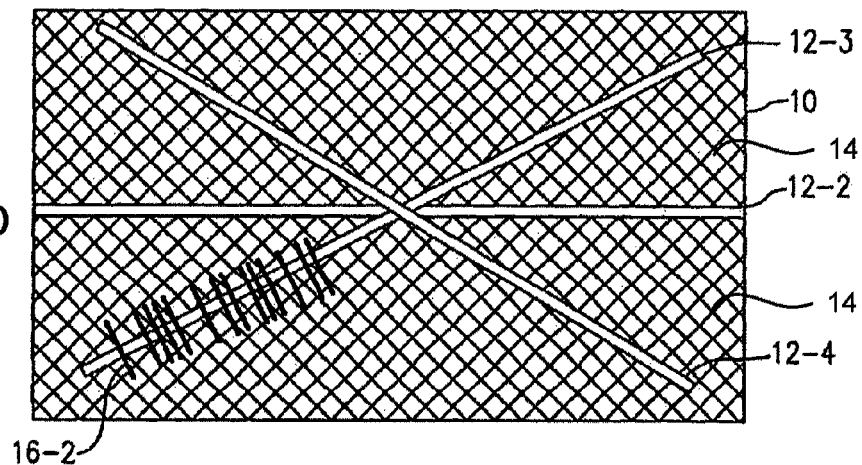

In the example of FIG. 6b, of control circuit executes a partial frame capture mode in order to capture data defining valid zones 12-2, 12-3 and 12-4 of a full frame of image data corresponding to a full field of view of a 2D image sensor. Valid zones 12-2, 12-3 and 12-4 are line patterns of image data at various angular orientations. Reading of pixels of line valid zones arranged at various angular orientations is effective to decode a 1D symbol which may be located at an oblique angle in a field of view. It is seen that reading of pixels of line valid zone 12-3 will result in the successful decoding of 1D bar code symbol 16-2. Zones 12-2, 12-3 and 12-4 may be one or more pixels wide.

Figure 6C:
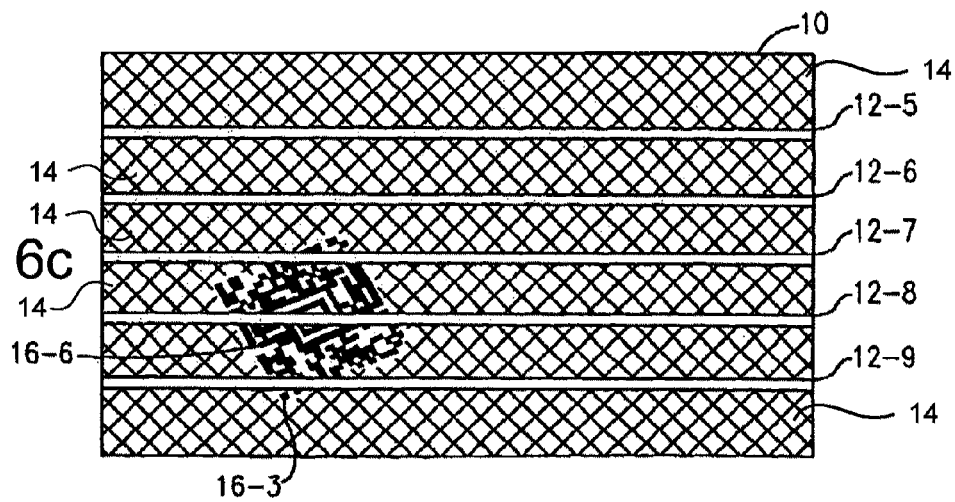

In the example of FIG. 6c, a control circuit executes a partial frame capture mode in order to clock out and capture image data defining valid zones 12-5 and 12-9. Valid zones 12-5 to 12-9 form a plurality of horizontal parallel lines. The pattern of valid zones shown in FIG. 6c clocked out and captured in a partial frame capture mode is effective for decoding substantially horizontally oriented 1D symbols which are at an unknown height in a full field of view. It is seen that the reading of image data of valid zone 12-8 will not result in the decoding of symbol 16-3 because symbol 16-3 is not a 1D symbol or stacked linear symbol. Nevertheless, because valid zone 12-8 intersects symbol bulls-eye 16b, reading of a image data of valid zone 12-8 may be effective to determine that a 2D symbol is likely present in the full field of view of image sensor 132. In one aspect of the invention, reader 14 may be configured to switch out of a partial frame capture mode and into a full frame capture mode when reading of image data captured in the partial frame capture mode reveals that a 2D symbol is likely to be represented in the image data corresponding to the image sensor's full field of view.

Figure 6D:
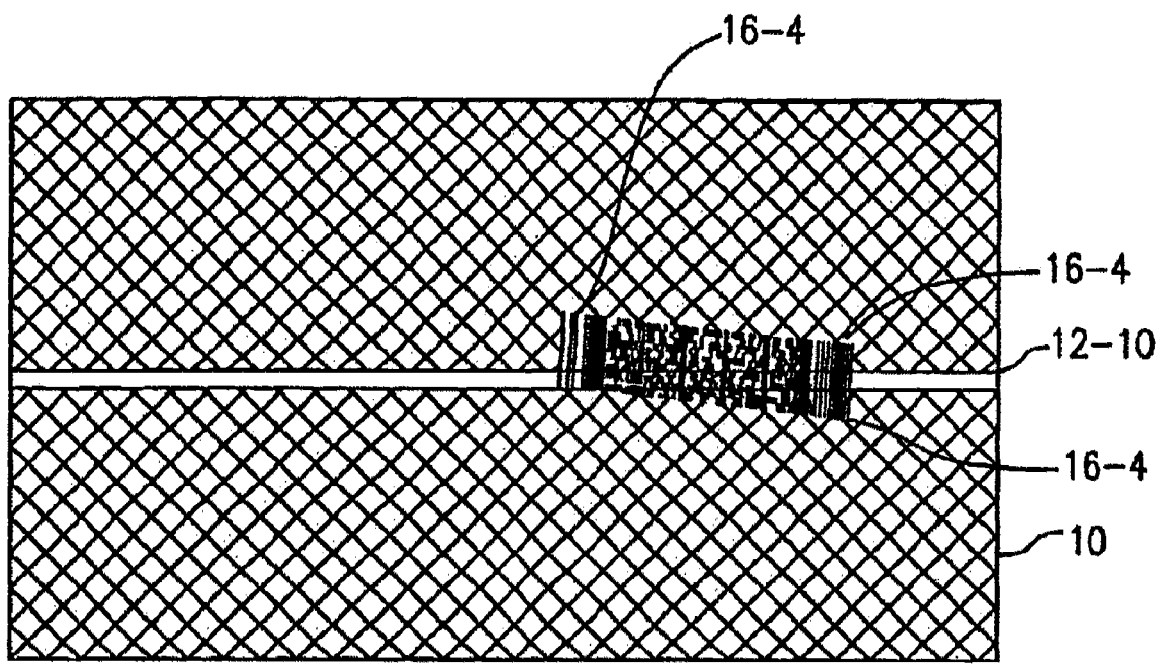
Figure 6E:
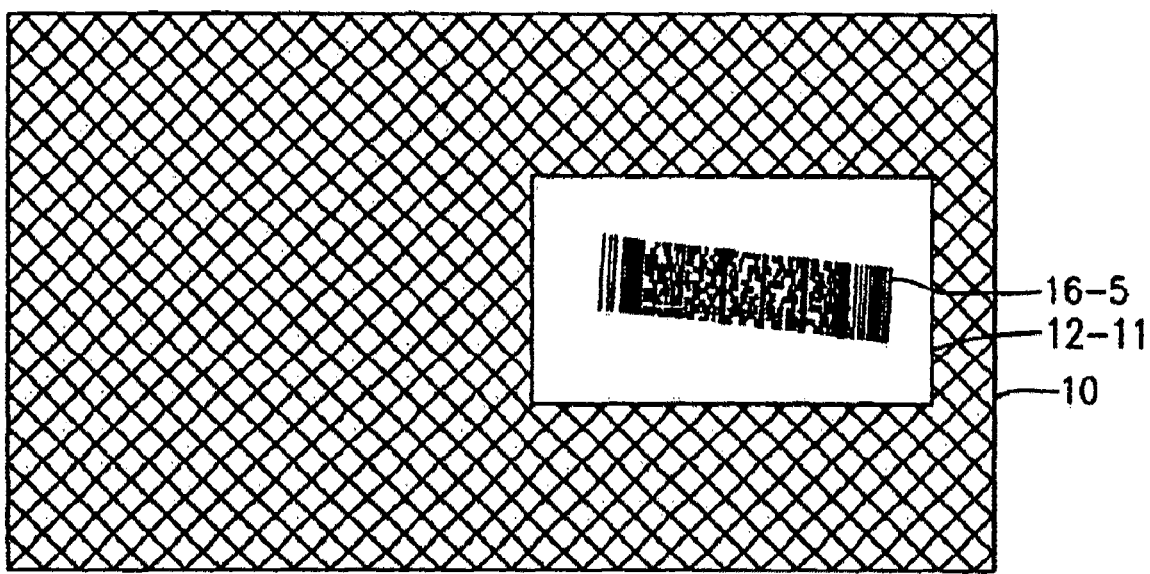
Figure 6F:
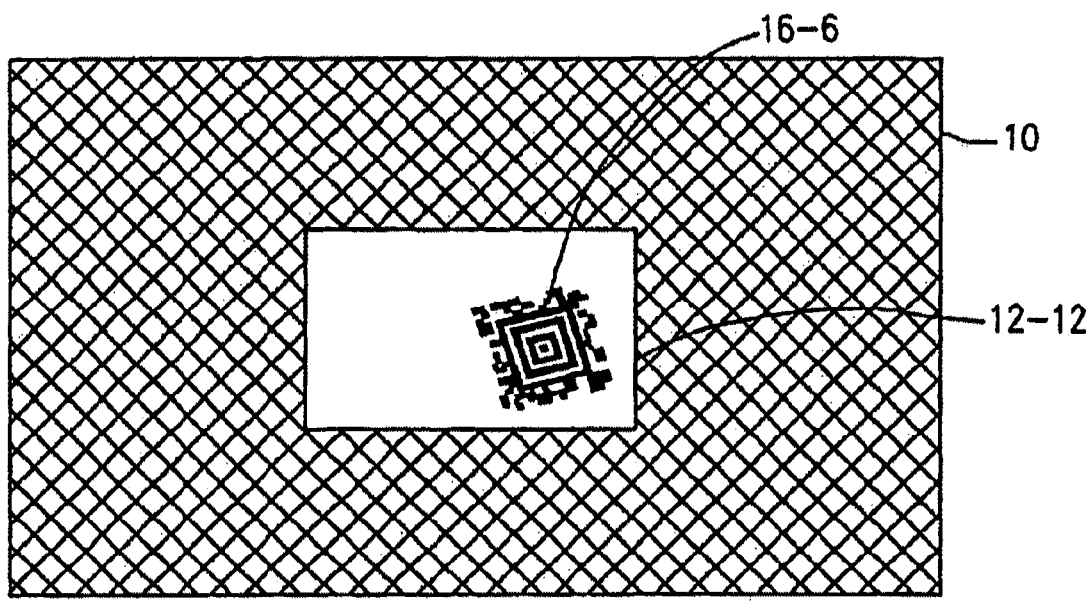
Figure 6G:
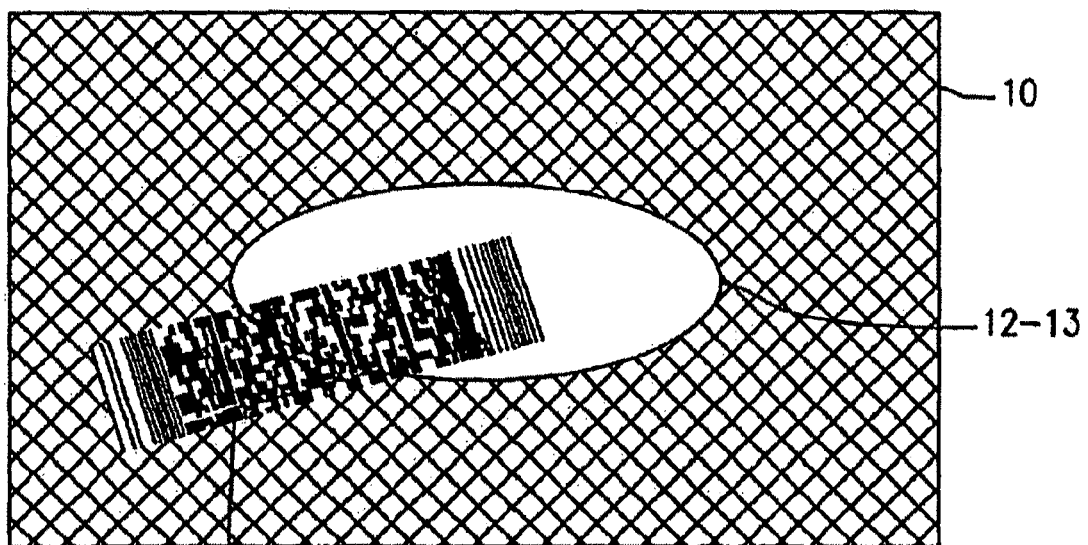

Another exemplary operating state of a reader operating in accordance with the invention is described with reference to FIGS. 6d and 6e. Operating in accordance with a third operating state, a reader operates in a partial frame capture mode to clock out and capture image data of valid zone 12-10 which corresponds to a predetermined pattern and position in field of view 10. It is seen that reading of image data of zone 12-10 will not be effective to decode symbol 16-4 because symbol 16-4 is of a type of 2D symbol known as a stacked linear bar code. Control circuit may nevertheless detect that symbol is a 2D symbol given that valid zone 12-10 intersects a finder pattern 16f of symbol 16-4.

Referring to FIG. 7, an exemplary method of image reading has a step 310 in which an image sensor is configured to output a select set of pixels from the imager pixel array. The select pixels may be a set of pixel rows, columns, or other configuration or combination. In a step 314, an image is captured and pixel data from the selected set of pixels is output into memory. Capturing an image may entail waiting for a valid image (i.e. an image which meets a predetermined configuration criteria) to be exposed. In a step 318, the data stored in memory is processed to determine whether it represents an information bearing indicia (IBI). If IBI data is detected, a query is made in a step 324 if enough data has been gathered to successfully read the IBI. If an IBI has been read, the read data is output for further use in a step 328. If the IBI data has not been successfully read a query is made in a step 332 whether the IBI data represents part of a stacked linear IBI. If the answer is no, then step 310 is repeated for another image read or scan. If the query answer is yes, the imager is reconfigured in a step 336 to output a different set of pixels from the imager pixel array, and another image is captured in step 314.

Figure 8:
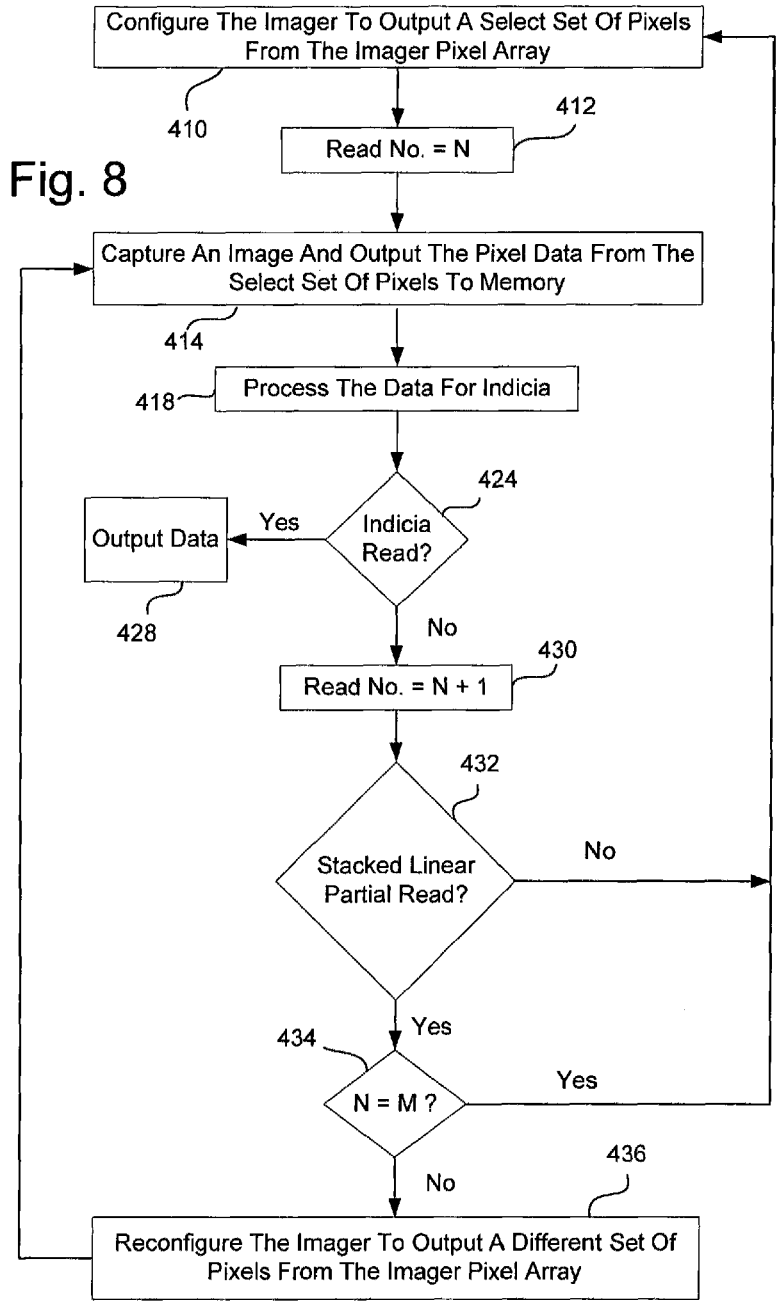
FIG. 8 is a flow chart of an exemplary method of operating an image reader.

Referring to FIG. 8, an exemplary method of image reading has a step 410 in which an image sensor is configured to output a select set of pixels from the imager pixel array. The select pixels may be a set of pixel rows, columns, or other configuration or combination. A read number counter is set to N in a step 412. In a step 414, an image is captured and pixel data from the selected set of pixels is output into memory. Capturing an image may entail waiting for a valid image (i.e. an image which meets a predetermined configuration criteria) to be exposed. In a step 418, the data stored in memory is processed to determine whether it represents an information bearing indicia (IBI). If IBI data is detected, a query is made in a step 424 if enough data has been gathered to successfully read the IBI. If an IBI has been read, the read data is output for further use in a step 428. If the IBI data has not been successfully read the read number counter is incremented by one in a step 430. A query is made in a step 432 whether the IBI data represents part of a stacked linear IBI. If the answer is no, then step 410 is repeated for another image read or scan. If the query answer is yes, a query is made in a step 434 whether the read number counter has reached a limit M. If the limit M has been met, step 410 is repeated for another image read or scan. If the limit M has not been met, the imager is reconfigured to output a different set of pixels from the imager pixel array, and another image is captured in step 414. The exemplary read number counter described in the flow chart may be in the form of a timer rather than a read number.

An exemplary system may utilize partially read IBI data, such as a partial read of a stacked 1D symbol for determining the next set of selected pixel to be output during a subsequent image capture.

In an exemplary embodiment, every row of the image sensor is exposed when an image is taken and only the predetermined rows of interest get reset at the beginning of the exposure window. Charge may be dumped for a given row at the beginning of the exposure window for that row, which may only happen in the rows which are being shipped out.

Described herein is an exemplary method of operating an optical reader having a 2D image sensor array having an array of rows and columns of pixels comprising the steps of: (a) configuring the image sensor array to output a select set of pixels; (b) capturing an image; (c) outputting the pixel data from the select set of pixels to memory; (d) processing the pixel data for information bearing indicia (IBI); (e) reconfiguring the image sensor array to output a different set of pixels; (f) repeating steps (b) through (e). The method may be performed or controlled by one or more processors, processor systems, configuration of electronic and imaging components.

An exemplary method includes the step of outputting IBI data if an IBI is read.

An exemplary method includes the step of determining whether the IBI has been partially read.

An exemplary method includes the step of utilizing the partially read IBI data for the reconfiguring in step (e).

An exemplary method includes the step exposing all pixel rows.

It should be understood that the programs, processes, methods and apparatus described herein are not related or limited to any particular type of computer or network apparatus (hardware or software). Various types of general purpose or specialized computer apparatus may be used with or perform operations in accordance with the teachings described herein. While various elements of the preferred embodiments have been described as being implemented in software, in other embodiments hardware or firmware implementations may alternatively be used, and vice-versa. The illustrated embodiments are exemplary only, and should not be taken as limiting the scope of the present invention. For example, the steps of the flow diagrams may be taken in sequences other than those described, and more, fewer or other elements may be used in the block diagrams. Also, unless applicants have expressly disavowed any subject matter within this application, no particular embodiment or subject matter is considered to be disavowed herein.

The claims should not be read as limited to the described order or elements unless stated to that effect. In addition, use of the term "means" in any claim is intended to invoke 35 U.S.C. §112, paragraph 6, and any claim without the word "means" is not so intended. Therefore, all embodiments that come within the scope and spirit of the following claims and equivalents thereto are claimed as the invention.

The invention claimed is:

1. A method of operating an optical reader having a 2D image sensor array having an array of rows and columns of pixels comprising the steps of:
   (a) selecting a set of pixels less than all of the pixels in the array;
   (b) exposing all rows pixels;
   (c) outputting pixel charge data only from the set of pixels to memory;
   (d) processing the pixel charge data for information bearing indicia (IBI);
   (e) selecting a different set of pixels; and
   (f) repeating steps (b) through (e).

2. A method according to claim 1, further comprising the step of outputting IBI data if an IBI is read.

3. A method according to claim 2, wherein the IBI read comprises at least one of the following: a 1-D barcode; a 2-D barcode; a 1-D stacked barcode; a logo; glyphs; and color-codes.

4. A method according to claim 1, further comprising the step of determining whether the IBI has been partially read.

5. A method according to claim 4, further comprising the step of utilizing the partially read IBI data for the reconfiguring in step (e).

6. A method according to claim 1, wherein the memory is integrated in a processor chip.

7. A method according to claim 1, wherein the memory is in an on board processor chip.

8. A method according to claim 1, wherein the select set of pixels are coincident with image sensor array rows at an optical axis center of the image sensor array.

9. A method of operating an optical reader in accordance with claim 1, further comprising illumination and aiming light sources having multiple color illumination, wherein the color is chosen in response to the color of the IBI most commonly imaged by the optical reader.

10. An optical reader comprising:
    a 2D image sensor array having an array of rows and columns of pixels; a processor adapted for:
    (a) selecting a set of pixels less than all of the pixels in the array;
    (b) exposing all rows of pixels;
    (c) outputting pixel charge data only from the set of pixels to memory;
    (d) processing the pixel charge data for information bearing indicia (IBI);
    (e) selecting a different set of pixels; and
    (f) repeating steps (b) through (e).

11. An optical reader according to claim 10, wherein the processor is adapted for outputting IBI data if an IBI is read.

12. An optical reader according to claim 10, wherein the processor is adapted for determining whether the IBI has been partially read.

13. An optical reader according to claim 11, wherein the IBI read comprises at least one of the following: a 1-D barcode; a 2-D barcode; a 1-D stacked barcode; a logo; glyphs; and color-codes.

14. An optical reader according to claim 12, wherein the processor is adapted for utilizing the partially read IBI data for the reconfiguring in step (e).

15. An optical reader according to claim 10, wherein the memory is in an on board processor chip.

16. An optical reader according to claim 10, wherein the select set of pixels are coincident with image sensor array rows at an optical axis center of the image sensor array.

17. An optical reader according to claim 10, further comprising illumination and aiming light sources having multiple color illumination, wherein the color is chosen in response to the color of the IBI most commonly imaged by the optical reader.

18. An optical reader comprising:
    a 2D image sensor array having an array of rows and columns of pixels;
    a processor to control: exposing all rows of pixels of the image sensor array;
    reading out charge data from a limited amount of first predetermined pixel rows less than the number of exposed pixel rows from the sensor into memory;
    processing the charge data for information bearing indicia;
    re-exposing rows of pixels of the image sensor array;
    reading out charge data from a limited amount of second predetermined pixel rows less than the number of re-exposed pixel rows of data from the sensor into the memory; and,
    processing the charge data for information bearing indicia.

19. A method of operating an optical reader having a 2D image sensor array having an array of rows and columns of pixels comprising the steps of:
    (a) exposing all rows of pixels of the image sensor array;
    (b) reading out a first set of selected pixel data from one or more pixels which are less than the total number of exposed pixels in step (a);
    (c) processing the first set of selected pixel data for information bearing indicia (IBI) information represented therein;
    (d) selecting a second set of pixels as a function of the IBI information;
    (e) exposing all rows of pixels of the image sensor array;
    (f) reading out a second set of selected pixel data from one or more pixels which are less than the total number of exposed pixels in step (e);
    (g) processing the second set of selected pixel data for IBI information represented therein.

* * * * *